United States Patent [19]

Kawa

[11] 3,967,241

[45] June 29, 1976

[54] PATTERN RECOGNITION SYSTEM

[75] Inventor: Ryuichi Kawa, Yokohama, Japan

[73] Assignee: Ricoh Co., Ltd., Tokyo, Japan

[22] Filed: Dec. 28, 1973

[21] Appl. No.: 429,342

[30] Foreign Application Priority Data

Dec. 31, 1972 Japan.................................. 48-310

[52] U.S. Cl.................... 340/146.3 H; 340/146.3 D
[51] Int. Cl.² .......................................... G06K 9/12
[58] Field of Search.............. 340/146.3 D, 146.3 Q, 340/146.3 H, 146.3 AQ

[56] References Cited
UNITED STATES PATENTS

| | | | |
|---|---|---|---|
| 3,182,290 | 5/1965 | Rabinow...................... | 340/146.3 Q |
| 3,263,216 | 7/1966 | Andrews...................... | 340/146.3 D |
| 3,533,068 | 10/1970 | Shinichi Hanaki et al.. | 340/146.3 D |
| 3,764,980 | 10/1973 | Dansac et al................ | 340/146.3 D |

OTHER PUBLICATIONS

A. Cutaia; Multilevel Character Recognition System IBM Tech. Disclosure Bulletin; vol. 13, No. 12, pp. 3739-3742; May 1971.

*Primary Examiner*—Joseph M. Thesz
*Attorney, Agent, or Firm*—Cooper, Dunham, Clark, Griffin & Moran

[57] ABSTRACT

In a pattern recognition system of the type in which an input pattern is read, and stored in a two-dimensional memory, and after the features of the input pattern are extracted, they are compared with the standard patterns in storage in such a way that the degrees of similarity of the input pattern to the standard patterns are obtained so as to establish one-to-one correspondence between the input pattern and one of the standard patterns in storage that has the maximum degree of similarity, a part of the input pattern is enlarged when the degrees of similarity of the input pattern to two of the standard patterns are in excess of a predetermined level, so that the features of the enlarged part of the input pattern information may be extracted so as to establish one-to-one correspondence between the input pattern and one of said two standard patterns. Additionally, a reject signal is provided when the input pattern has a greater-than-predetermined similarity to three or more standard patterns.

5 Claims, 5 Drawing Figures

PATTERN RECOGNITION SYSTEM

BACKGROUND AND SUMMARY OF THE INVENTION

The present invention relates to generally a pattern recognition system and more particularly a pattern recognition system capable of identifying the input patterns correctly even when an input pattern has a strong similarity with more than one standard patterns in storage for identification.

In a conventional superposition type pattern recognition system, an input pattern is superposed upon each of standard patterns of different categories in storage so that there may be established one-to-one correspondence between the input pattern and a number of the standard pattern which has the maximum similarity to the input pattern. The pattern recognition system of the type described is simple in construction so that it has been widely used in various fields especially when the characters and numerals to be identified have been standardized. The superposition type pattern recognition system is also used in order to identify the characters and numerals written within a predetermined space or block, but an additional operation for normalizing the deviation of a character or numeral from the standard is required. Furthermore, in the superposition type pattern recognition system, the overall input and standard patterns are compared with each other in order to determine the degree of similarity therebetween. Therefore, when the overall input and standard patterns are similar macroscopically, the similarity of the input pattern to the standard pattern is determined as strong even when they are apparently different from each other in minute points. As a result, an input pattern is identified as having strong similarity to two or more standard patterns so that identification of the input pattern becomes impossible.

One of the objects of the present invetnion is therefore to provide an improved pattern recognition system capable of correctly identifying an input pattern even when it exhibits strong similarity to more than one standard pattern of different categories in storage.

In general a human observer identifies a pattern such as a character first by discerning the overall configuration of this pattern and then distinguishing the specific features of the pattern when he sees that its overall configuration has strong similarity to more than one pattern so as to reach the final conclusion. The present invention may simulate this humane pattern recognition process.

According to one embodiment of the present invention, an input pattern is converted by an input device into electrical video signals, which are quantized and stored in a two-dimensional memory. The input pattern information stored in the memory is converted into a plurality of analog voltages representing the features of the input pattern. The analog voltages are applied to a similarity identification unit so that the degree of similarity of the input pattern to the standard patterns in storage may be obtained. In accord with the present invention, the similarity of the input pattern to each of the standard patterns is represented by an analog voltage. The analog output voltages are applied to an identification unit so that there may be established one-to-one correspondence between the input pattern and one of the standard patterns when only one analog output voltage representing said one standard pattern is in excess of a predetermined level. The above steps are similar to those of the conventional pattern recognition systems. According to the present invention, when the input pattern exhibits strong similarity to two of the standard patterns in storage, an input pattern enlargement control unit is actuated to enlarge a part of the input pattern so that the latter may be identified as belonging to one of the two standard patterns based upon the features extracted from the enlarged input pattern. However when the input pattern exhibits similarity to three or more standard patterns in storage, a signal representing the impossibility of identification of the input pattern (or rejection thereof) is generated.

The above and other objects, features and advantages of the present invention will become more apparent from the following description of one preferred embodiment thereof taken in conjunction with the accompanying drawing.

BRIEF DESCRIPTION OF THE DRAWING

FIG. 2(a) shows one example of an input pattern stored in a two-dimensional memory thereof;

DESCRIPTION OF THE PREFERRED EMBODIMENT

Figure 1:
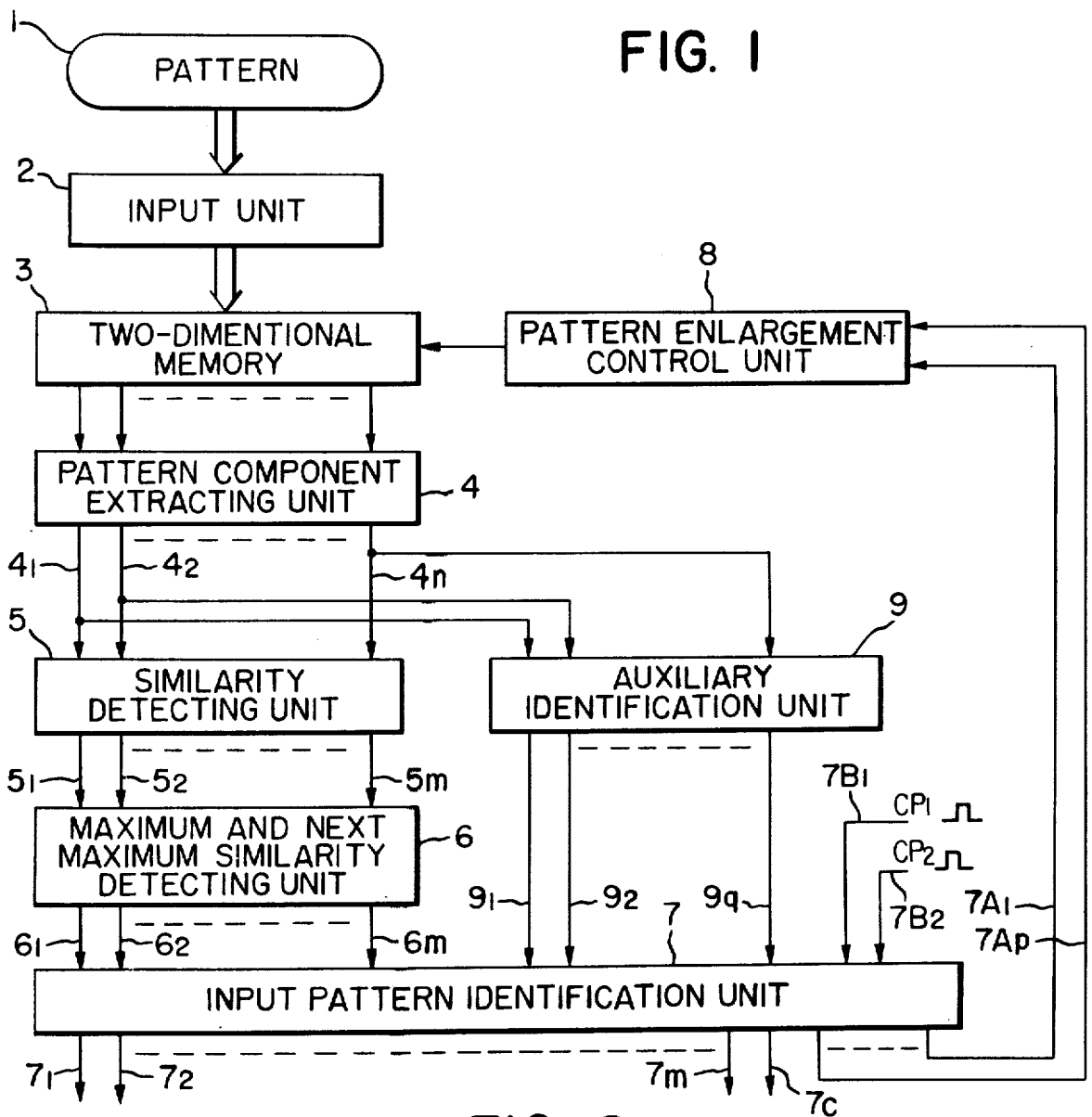
FIG. 1 is a block diagram of one preferred embodiment of a pattern recognition system in accordance with the present invention.

Referring to FIG. 1, an input unit 2 reads a pattern 1 and converts it into electrical signals in such a way that the digital 1 signal represents a black elementary area while the digital 0 signal represents a white elementary area. The digital video signals are transferred into a two-dimensional memory 3. The input unit 2 is of a conventional type comprising, for instance, a flying spot scanner or an array of photoelectric cells and a quantizer adapted to convert the output of the former into the electrical video signals in the manner described above. The two-dimensional memory 3 comprises a plurality of shift registers arrayed two-dimensionally. Since the input unit 2 and the two-dimensional memory are well known to the art further description thereof will not be given in this specification.

The output of the memory 3 is transferred into a pattern component extracting unit 4 which is adapted to divide the input pattern information read out from the memory 3 into a number of $n$ regions and to provide the pattern component signals each representing each of $n$ regions which in turn are applied to a number of $n$ linear adder circuits. Each of the latter circuits is adapted to provide an analog voltage in proportion to the number of digital signals 1 in each of the pattern component signals. The pattern component extracting unit 4 of the type described is well known in the art. The output signals of the pattern component extracting unit 4 are transferred through output lines $4_1$ to $4_n$ to a similarity detecting unit 5 and to an auxiliary identification unit 9.

The $n$ analog voltages transferred into the similarity detecting unit 5 are compared with a number of $m$ standard patterns in storage and converted into a number of $m$ analog voltages each representing the degree of similarity to each of the standard patterns. The $m$ analog voltages are transferred through output lines $5_1$ to $5_m$ to a maximum and next-maximum similarity detecting unit 6, which is adapted to convert the maximum analog voltage among said $m$ analog voltages and the analog voltages whose ratio to said maximum analog voltage is higher than a predetermined ratio, for instance, 70 percent, into the digital signals "1"s and to convert the analog voltages whose ratio is less than 70 percent into the digital signals "0"s. The output signals of the detecting unit 6 are transferred through output lines $6_1$ to $6_m$ to an input pattern identification unit 7.

The identification unit 7 is adapted to provide the digital 1 signal on one of output lines $7_1$ to $7_m$, each of which corresponds to each of $m$ standard patterns of different categories, in response to a timing pulse $CP_1$ transmitted through an input line 7B when only one of the $m$ output signals transmitted from the detecting unit 6 is 1. The identification unit 7 is adapted to provide a strobe signal STB on an output line 7C simultaneously when it provides the digital 1 signal on one of the output lines $7_1$ to $7_m$. When the digital 1 output signals transmitted from the detecting unit 6 are three or more, the identification unit 7 provides the strobe signal STR in response to the timing pulse $CP_1$, but provides the digital 0 signals on all of the output lines $7_1$ to $7_m$. This means that the identification unit 7 cannot identify the input pattern information. When the detecting unit 6 provides two digital 1 output signals, the identification unit 7 provides not only two digital 1 signals on corresponding two of the output lines $7_1$ to $7_m$ but also a pattern enlargement signal in response to the timing signal $CP_1$.

A pattern enlargement control unit 8 is adapted to enlarge a specific region of the input pattern information stored in the memory 3 in response to the pattern enlargement signal transmitted from the identification unit 7. The enlarged specific region is converted into $n$ analog voltages by the pattern component extracting unit 4 and transferred into the auxiliary identification unit 9. It should be noted that two digital 1 output signals of the detecting unit 6 are maintained even when the specific region is enlarged.

The auxiliary identification unit 9 comprises q/2 adder-substractors each of which is adapted to identify to which of the two standard patterns the enlarged input pattern belongs. The identification unit 7 is adapted to provide the digital 1 output signal on one of the output lines $7_1$ to $7_m$ in response to the two digital 1 output signals from the detecting unit 6 and in response to the output signal transmitted to the identification unit 7 from the auxiliary identification unit 9 through one of its output lines $9_1$ to $9_q$. In this case the digital 1 output signal is provided in synchronism with the timing pulse $CP_2$ transmitted through an input line $7B_2$, and the strobe signal STB is also simultaneously provided. However, when no output signal is transmitted from the auxiliary unit 9 to the identification unit 7, the latter provides only the strobe signal STB in synchronism with the timing pulse $CP_2$. This means that the identification of the input pattern is impossible.

Figure 2:
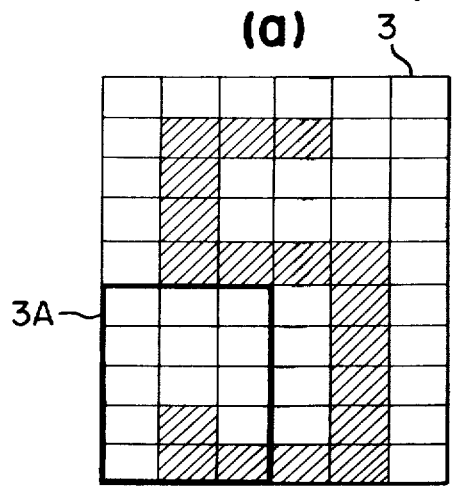
FIG. 2 (b) shows an enlarged part thereof.
Figure 2:
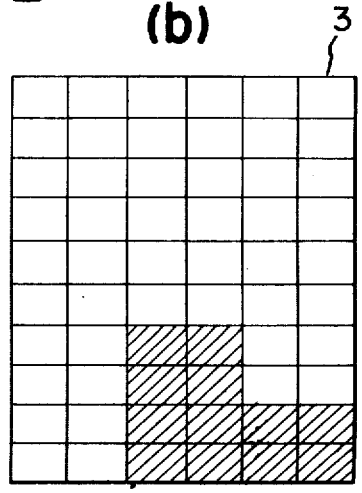

FIG. 2 shows an example of a pattern, that is a numeral "5" stored in the two-dimensional memory 3. When this pattern is identified as "5" and "6" as the result of the similarity detection by the unit 5, a specific region 3A of the pattern shown in FIG. 5(a), which is determined in response to the control signals transmitted from the identification unit 7 through output line $7A_1$ to $7A_p$, is enlarged, for instance, two times as shown in FIG. 5(b). In general the two-dimensional memory 3 is made up by a plurality of shift registers so that any partial region of the pattern stored in the memory may be easily enlarged based upon the conventional digital techniques.

Figure 3:
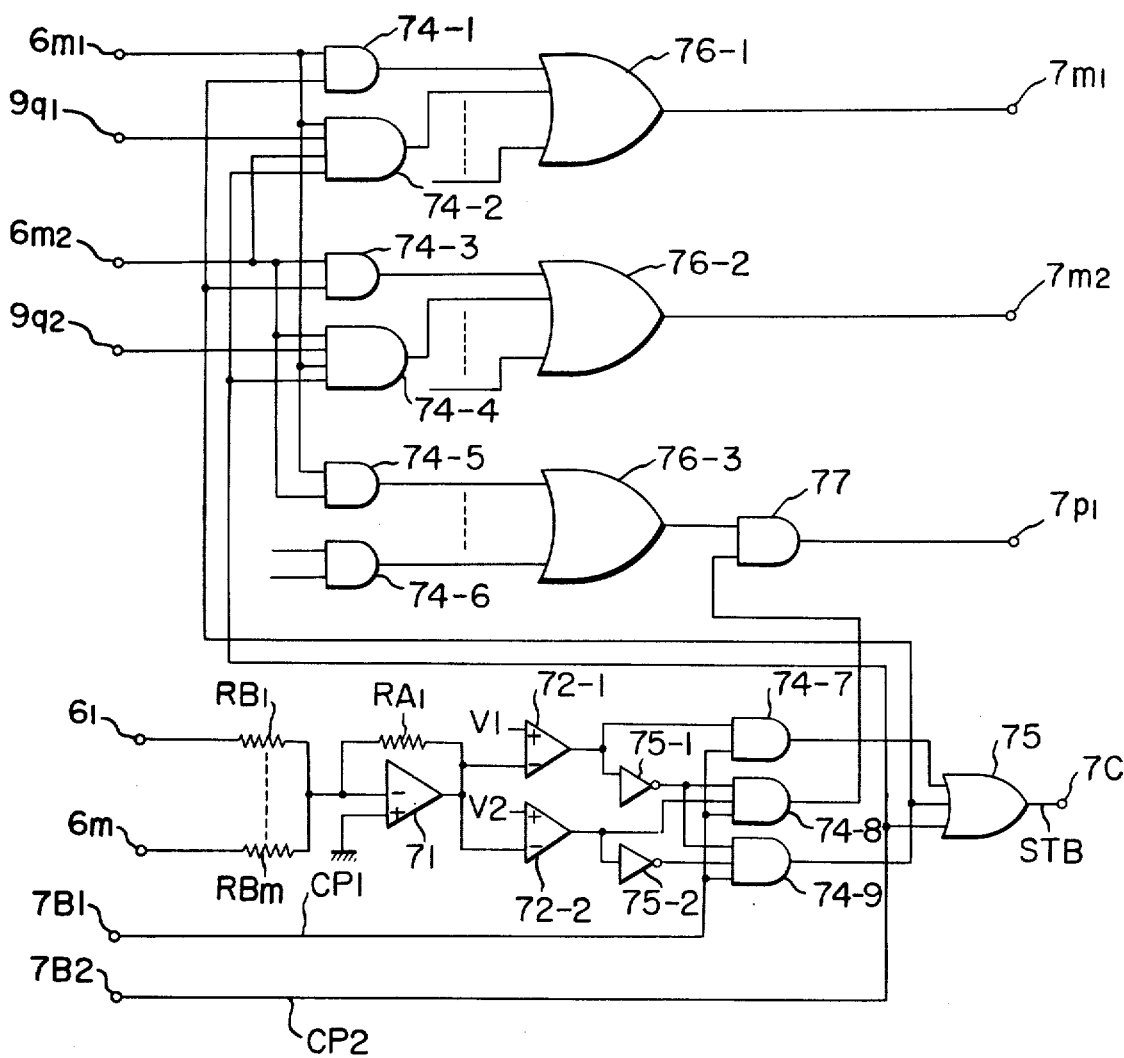
FIG. 3 is a circuit diagram of an input pattern identification unit.

Next referring to FIG. 3, the identification unit 7 will be described in more detail hereinafter. The outputs of the maximum and next maximum detecting unit 6 (See FIG. 6) are applied through the output lines $6_1$ to $6_m$ to an adder circuit comprising resistors $RB_1$ to $RB_m$ (where $RB_1 = RB_2 = RB_m$) and $RA_1$ and an operational amplifier 71. The reference voltage $V_1$ is so selected that when the detecting unit 6 provides three or more digital 1 signals, a first comparator 72-1 provides the digital signal 1 while the reference voltage $V_2$ is so selected that when the detecting unit 6 provides two or more digital 1 output signals, a second comparator 72-2 provides the digital 1 output signal. When the digital 1 output signal appears, for instance, only on the output line $6_{ml}$, the outputs of the both first and second comparators 72-1 and 72-2 are "0"s so that the outputs of the inverters 73-1 and 73-2 are "1"s. Therefore an AND gate 74-9 is opened in response to the outputs "1"s of the inverters 73-1 and 73-2 and to the timing pulse $CP_1$ so that the strobe signal STB is transmitted through an OR gate 75. Furthermore the identification signal is transmitted through an AND gate 74-1 and an OR gate 76-1 to the output line $7_{ml}$. When the detecting unit 6 provides three or more digital "1" output signals, an AND gate 74-7 is opened in response to the output of the comparator 72-1 and the pulse $CP_1$ so that the strobe signal STB also appears on the output line 7C of the OR gate 75, but no signal appears on the output lines $7_1$ to $7_m$. When the digital 1 output signals appear on the output lines $6_{ml}$ and $6_{m2}$, an AND gate 74-8 is opened in response to the output of the inverter 73-1, the output of the comparator 72-2 and the pulse $CP_1$ to transmit the signal to the input of an AND gate 77 to which is also applied the digital 1 signal through an AND gate 74-5 and an OR gate 76-3. Therefore the AND gate 77 is opened to transmit the enlargement signal through the output line $7_{pl}$, so that the pattern enlargement control unit 8 (See FIG. 1) is actuated to enlarge a specific region of the input pattern stored in the two-dimensional memory 3. Thus the outputs of the auxiliary identification unit 9 are applied to the identification unit 7 through the output lines $9_1$ to $9_q$.

It is now assumed that the categories cm1 and cm2 correspond to the output signals which appear on the output lines $6_{ml}$ and $6_{m2}$, respectively and that the output signals which are used for identification of the categories cm1 and cm2 are transmitted through the output lines $9_{q1}$ and $9_{q2}$, respectively. That is, the output signal 1 on the output line $9_{q1}$ designates the category cm1 while the digital 1 output signal on the output line $9_{q2}$ denotes the category cm2. On the other hand, when the digital 0 signals appear on both output lines $9_{q1}$ and $9_{q2}$, the identification of the input pattern becomes impossible. When the digital 1 output signal appears on the output line $9_{q2}$, the OR gate 75 provides the strobe signal STB in response to the timing pulse $CP_2$, and an AND gate 74-4 is opened in response to the output signals transmitted through the output lines $6_{ml}$, $6_{m2}$ and $9_{q2}$ so that the digital 1 signal appears on the output line $7_{m2}$ of an OR gate 76-2. Thus, the input pattern is identified as belonging to the category cm2.

Figure 4:
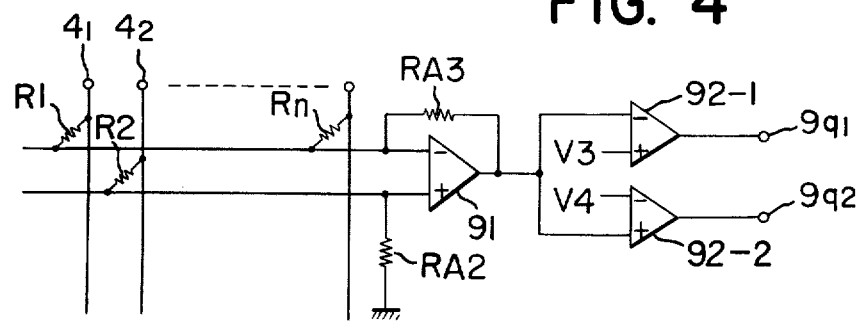
FIG. 4 is a fragmentary circuit diagram of an auxiliary input pattern identification unit.

FIG. 4 is a fragmentary circuit diagram of the auxiliary identification unit 9. The $n$ analog output voltages from the pattern component extracting unit 4 are transmitted through the output lines $4_1$ to $4_n$ to an adder-subtractor comprising resistors $R_1$ to $R_n$, $RA_2$ and $RA_3$ and an operational amplifier 91 which is connected to a first and second comparators 92-1 and 92-2. When the enlarged input pattern belongs to the category $cm1$, the digital 1 output signal appears on the output line $9_{q1}$. In like manner, when the enlarge input pattern is identified as belonging to the category $cm2$, the digital 1 output signal appears on the output line $9_{q2}$. The reference voltage $V_4$ is so selected as to be higher than the reference voltage $V_3$. The values of the resistors $R_1$ to $R_n$ and whether they are connected to the positive or negative polarity input terminals of the operational amplifier 91 are so determined that the enlarged input pattern may be identified in the most stable manner. The values of the resistors $RA_2$ and $RA_3$ are selected depending upon those of the resistors $R_1$ to $R_n$.

What is claimed is:

1. A pattern recognition system comprising
   a. pattern input means adapted to read an input pattern and to convert it into quantized electrical video signals;
   b. a two-dimensional memory adapted to store therein said electrical video signals as an input pattern information;
   c. similarity detecting means adapted to detect the degree of similarity of said input pattern information with stored standard patterns of different categories;
   d. input pattern identification means adapted to establish one-to-one correspondence between said input pattern information and one of said standard patterns when the degree of similarity of said input pattern information to only one standard pattern is high, and also adapted to provide an input pattern enlargement signal when the degree of similarity of said input pattern information with at least two of said standard patterns is high;
   e. an input pattern information enlargement control means adapted to enlarge a selected part of said input pattern information stored in said two-dimensional memory in response to said input pattern enlargement signal from said identification means; and
   f. an auxiliary input pattern identification means adapted to extract selected features of said enlarged input pattern information so as to identify and establish a one-to-one correspondence between said enlarged input pattern information and only one of said plurality of standard patterns.

2. A pattern recognition system as defined in claim 1 wherein said degree of similarity of said input pattern information with each of said standard patterns of different categories in storage is represented by an analog voltage.

3. A pattern recognition system as defined in claim 2 further comprising
   means adapted to convert into the digital 1 signal each analog voltage representing a higher-than-predetermined degree of similarity of said input pattern information with a standard pattern and also adapted to convert into the digital 0 signal each analog voltage representing a lower-than-predetermined degree of similarity of said input pattern information with a standard pattern.

4. A pattern recognition system as defined in claim 3 wherein said input pattern identification means is adapted to establish one-to-one correspondence between said input pattern information and one of said standard patterns of different categories in storage when only one digital 1 signal representing the degree of similarity of said input pattern information with said one standard pattern is produced, said identification means is also adapted to generate a signal representing the rejection or impossibility of identification of said input pattern information in response to three or more digital 1 signals, and to generate a signal, which is transmitted to said auxiliary identification means as said input pattern information enlargement signal, and which represents the combination of two of said standard patterns in storage when two digital 1 signals representing said two standard patterns, respectively, are produced.

5. A pattern recognition system comprising:
   means for converting an analog in input pattern into a corresponding digitized input pattern;
   means for storing the digitized input pattern;
   means for extracting selected components only of digitized patterns applied thereto;
   means for applying to the component extracting means a digital pattern determined by characteristics of the entire digitized input pattern stored in the storing means to cause the extracting means to provide a first set of extracted components;
   means for comparing the first set of extracted components with each of a plurality of additional sets of components similarly extracted from reference digitized patterns to determine the degree of similarity between the compared sets of components;
   means responsive to a determination that the degree of similarity between the first set of extracted components and each of at least two of said additional sets of extracted components is greater than a selected threshold to provide an enlargement signal;
   means responsive to the enlargement signal for applying to the same component extracting means a digital pattern determined only by a selected, enlarged portion of the input digitized pattern stored in the same storing means to cause the extracting means to provide a second set of extracted components; and
   means for comparing said second set of extracted components with additional sets of components similarly extracted only from selected, enlarged portions of reference patterns to determine the degree of similarity between the second set of extracted components and each of the last recited additional sets of extracted components.

* * * * *